United States Patent
Gagnon et al.

(10) Patent No.: US 9,819,544 B2
(45) Date of Patent: Nov. 14, 2017

(54) METHOD FOR CONFIGURING DEVICES IN A DAISY CHAIN COMMUNICATION CONFIGURATION

(71) Applicant: Distech Controls, Inc., Brossard (CA)

(72) Inventors: Dominic Gagnon, St-Bruno-de-Montarville (CA); Danny Breton, Saint-Jean sur Richelieu (CA); Francois Ouellet, Brossard (CA)

(73) Assignee: Distech Controls Inc., Brossard, QC (CA)

( * ) Notice: Subject to any disclaimer, the term of this patent is extended or adjusted under 35 U.S.C. 154(b) by 379 days.

(21) Appl. No.: 14/530,119

(22) Filed: Oct. 31, 2014

(65) Prior Publication Data

US 2016/0127173 A1    May 5, 2016

(51) Int. Cl.
    *G06F 15/16*     (2006.01)
    *H04L 12/24*     (2006.01)
    *H04L 12/40*     (2006.01)

(52) U.S. Cl.
CPC ...... *H04L 41/082* (2013.01); *H04L 12/40019* (2013.01); *H04L 12/40123* (2013.01); *H04L 41/0806* (2013.01); *H04L 2012/40228* (2013.01)

(58) Field of Classification Search
CPC .................. H04L 41/082; H04L 12/40019
USPC .......................................... 709/211, 223–225
See application file for complete search history.

(56) References Cited

U.S. PATENT DOCUMENTS

| | | | | |
|---|---|---|---|---|
| 5,539,390 A | * | 7/1996 | Nagano | H04B 1/205 340/9.16 |
| 6,750,781 B1 | * | 6/2004 | Kim | H02J 13/0082 340/12.32 |
| 6,911,916 B1 | * | 6/2005 | Wang | A61B 5/7475 340/3.5 |
| 2008/0225989 A1 | * | 9/2008 | An | G06F 7/68 375/326 |
| 2014/0029172 A1 | * | 1/2014 | Yoo | H02J 1/10 361/679.01 |
| 2016/0056668 A1 | * | 2/2016 | Bartlett | H02J 13/0017 307/39 |

FOREIGN PATENT DOCUMENTS

WO     2009139778 A1     11/2009

* cited by examiner

*Primary Examiner* — Duyen Doan
(74) *Attorney, Agent, or Firm* — RatnerPrestia

(57) ABSTRACT

A master device, daisy-chained devices, and a method for configuring the daisy-chained devices are provided. The master device generates a signal having a pre-determined base frequency, and outputs the signal generated to a first device in the daisy chain communication configuration. Each daisy-chained device receives an input signal, having an input frequency, from a previous daisy-chained device. Each daisy-chained device generates an output signal having an output frequency different to and based on the input frequency of the received signal, and outputs the output signal to a following daisy-chained device. Each daisy-chained device further determines an address of a communication interface, for exchanging data with the master device, based on the input frequency of the received signal. For example, the output frequency of the output signal is half the input frequency of the received signal.

20 Claims, 5 Drawing Sheets

METHOD FOR CONFIGURING DEVICES IN A DAISY CHAIN COMMUNICATION CONFIGURATION

TECHNICAL FIELD

The present disclosure relates to the field of data transmission in a daisy chain communication configuration. More specifically, the present disclosure relates to a method for configuring devices in a daisy chain communication configuration.

BACKGROUND

A daisy chain communication configuration is a chain of devices, where each device in the chain receives signals from a preceding device in the chain and transmits signals to a following device in the chain. Thus, a device of rank I in the chain only communicates signals directly with devices of ranks I−1 and I+1 in the chain, and cannot communicate signals directly with devices of ranks I−2, I+2, etc.

An environment control system comprises a plurality of devices (such as environment controllers, sensors and controlled appliances) communicating with each other for exchanging environmental data. The environmental data are transmitted from a source device to a destination device over a communication link via a message comprising the environment data and an identifier (e.g. an address) of the destination device. When the destination device receives the message, it determines that it is the recipient of the message based on the identifier (e.g. the address) in the message.

Since an environment control system comprises a plurality of heterogeneous devices (which may need to be replaced or upgraded), determining and configuring an address for each specific device, and sharing the address with other devices which need to communicate with this specific device is usually a complicated process.

The present disclosure provides a new method of configuring a plurality of devices, more specifically of determining and configuring an address for each of the devices, making use of a daisy chain communication configuration for this purpose.

SUMMARY

In accordance with a first aspect, the present disclosure relates to a device for use in a daisy chain communication configuration. The device comprises an input for receiving a signal having an input frequency from a preceding device in the daisy chain communication configuration. The device comprises a frequency divider for generating an output signal having an output frequency half of the input frequency of the received signal. The device comprises an output for outputting the output signal to a following device in the daisy chain communication configuration. The device comprises a processing unit for determining an address of the device based on the input frequency of the received signal.

In accordance with a second aspect, the present disclosure relates to a master device for use in a daisy chain communication configuration. The master device comprises memory for storing, for each device of the daisy chain communication configuration, an address of the device and characteristics of the device. The master device comprises an output for transmitting a signal having a pre-determined frequency to a first device in the daisy chain communication configuration. The master device comprises a communication interface for exchanging data with the devices of the daisy chain communication configuration, using the addresses of the devices stored in the memory. The master device comprises a processing unit for generating the data transmitted to a device of the daisy chain communication configuration via the communication interface. The generated data depend on the characteristics of the device stored in the memory. The processing unit further processes the data received from a device of the daisy chain communication configuration via the configuration interface, the processing depending on the characteristics of the device stored in the memory.

In accordance with a third aspect, the present disclosure relates to a method for configuring devices in a daisy chain communication configuration. The method comprises generating, at a master device, a signal having a pre-determined base frequency. The method comprises outputting the signal generated to a first device in the daisy chain communication configuration. The method comprises receiving the signal at a next device in the daisy chain communication configuration from a previous device in the daisy chain communication configuration. The received signal has an input frequency. The method comprises generating, at the current device, an output signal having an output frequency different than the input frequency of the received signal. The method comprises outputting the output signal to a following device in the daisy chain communication configuration. The method comprises determining an address of each device based on the input frequency of the received signal.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the configuration of devices operating and communicating in a master/controlled relationship, particularly in the context of an environment control system.

Terminology

The following terminology is used throughout the present disclosure:

Environment: condition(s) (temperature, pressure, oxygen level, light level, security, etc.) prevailing in a controlled area or place, such as for example in a building.

Environment control system: a set of devices which collaborate for monitoring and controlling an environment.

Environmental data: any data (e.g. information, commands) related to an environment that may be exchanged between devices of an environment control system.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Examples of sensor functionalities include: temperature measurement, humidity measurement, air pressure measurement, voltage measurement, apparatus on/off status determination, carbon monoxide detection, flood detection, intrusion alarm, fire alarm, etc.

Controlled appliance: device that receives a command and executes the command. The command may be received from an environment controller. Examples of controlled appliances include: a temperature thermostat, a ventilation system, an apparatus on/off switch, a surveillance camera, etc.

Environment controller: device capable of receiving information related to an environment (e.g. from a sensor) and/or sending commands based on such information (e.g. to a controlled device).

Figure 1:
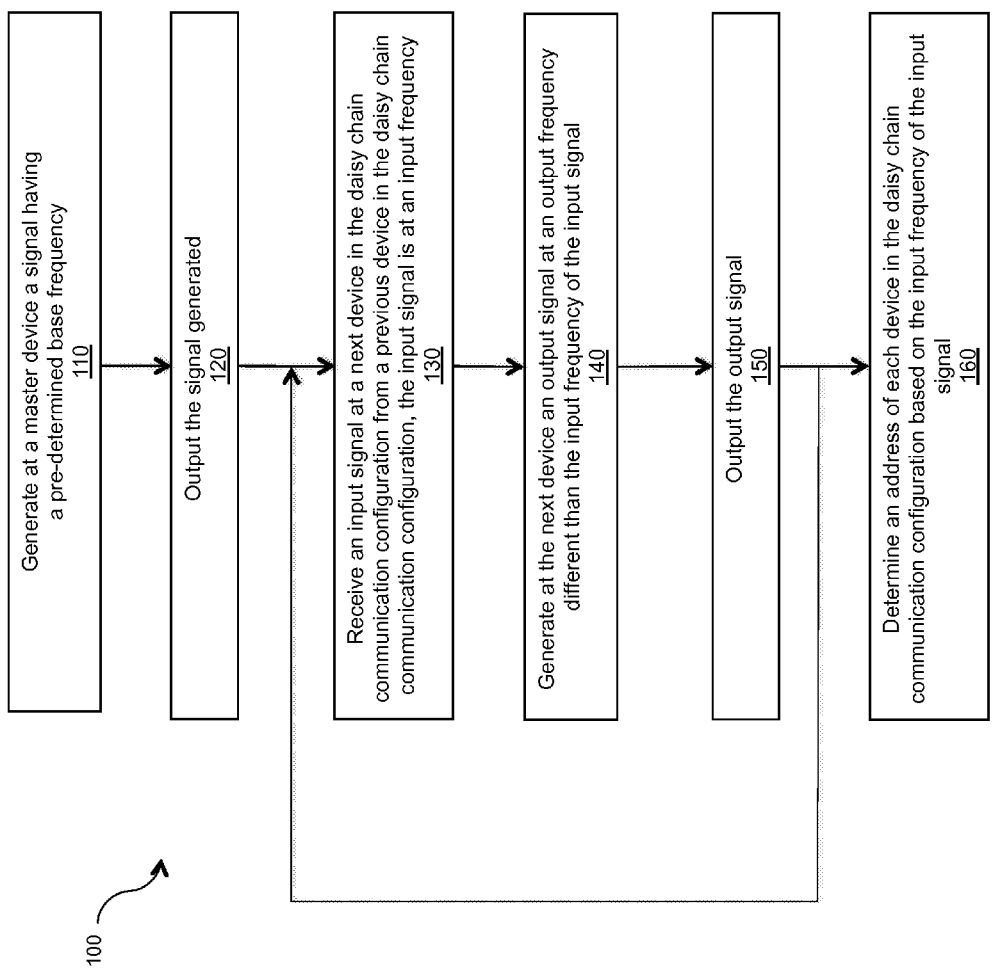
FIG. 1 illustrates a method for configuring devices in a daisy chain communication configuration.
Figure 2:
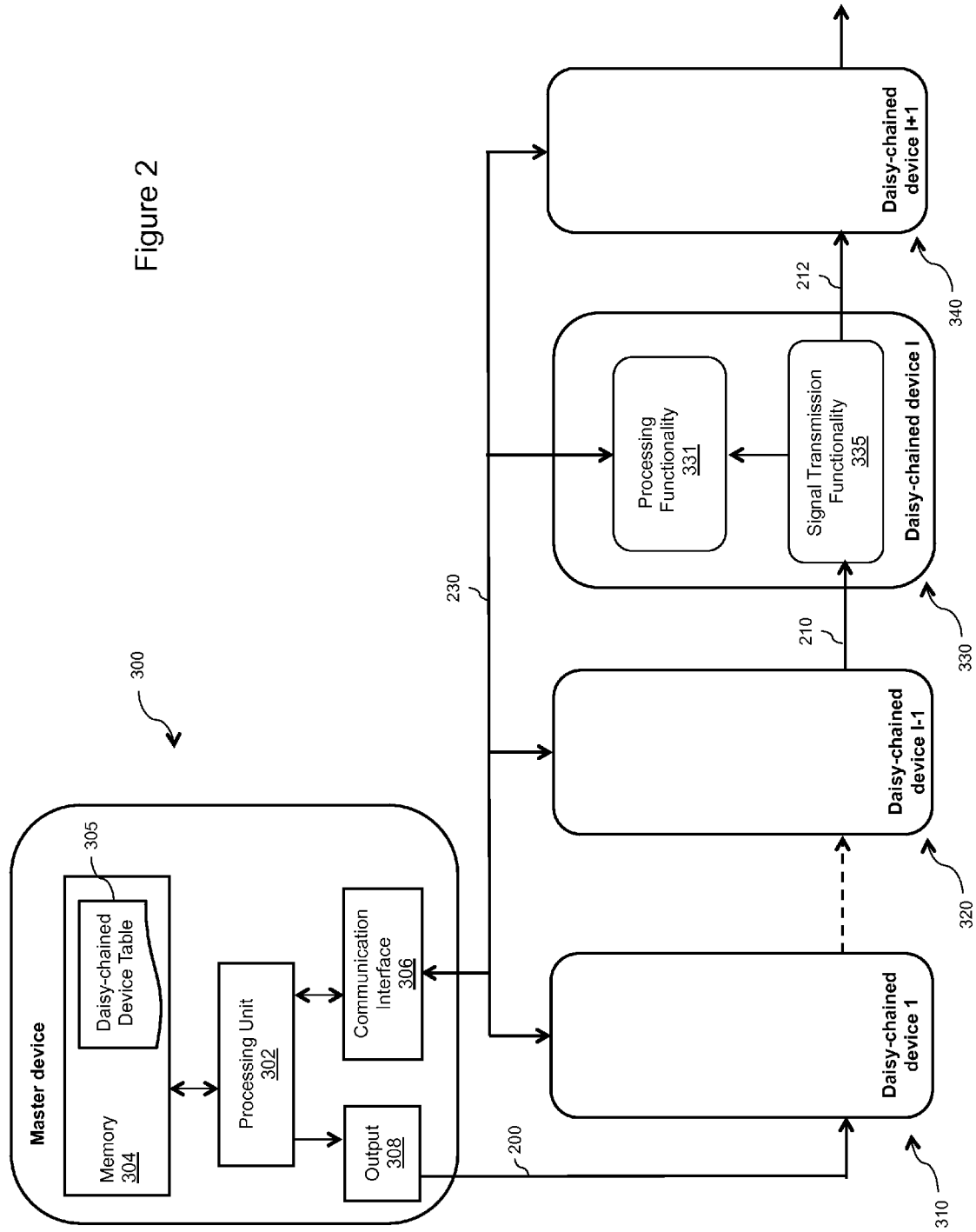
FIG. 2 illustrates a master device and daisy-chained devices for use in a daisy chain communication configuration.
Figure 3:
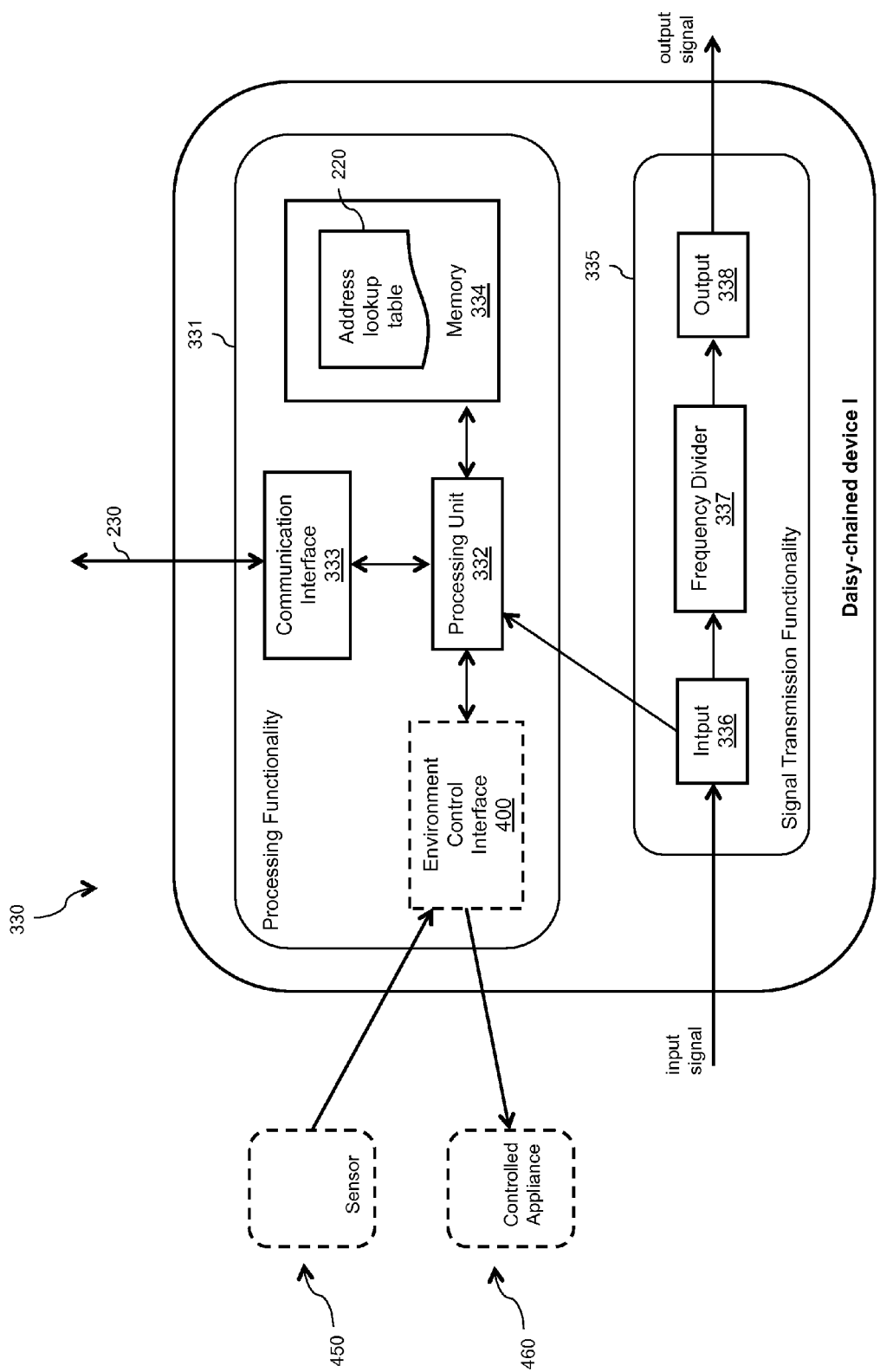
FIG. 3 illustrates components of a daisy-chained device of FIG. 2.

Referring now concurrently to FIGS. 1, 2 and 3, a method 100 and devices 300, 310, 320, 330 and 340 for configuring devices in a daisy chain communication configuration are represented.

The device 300 is a master device. The master device 300 comprises a processing unit 302, having one or more processors (not represented in FIG. 2) capable of executing instructions of a computer program. Each processor may further have one or several cores. The master device 300 also comprises memory 304 for storing instructions of the computer program, data generated by the execution of the computer program, etc. Only a single memory 304 is represented in FIG. 2, but the master device 300 may comprise several types of memories, including volatile memory (such as a volatile Random Access Memory (RAM)), non-volatile memory (such as a hard drive), etc.

The master device 300 further comprises an output 308 for transmitting a signal 200 generated by the master device 300 to a first device 310 in a daisy chain communication configuration. The master device 300 also comprises a communication interface 306 for exchanging data with devices (e.g. 310, 320, 330 and 340) of the daisy chain communication configuration over a communication link 230.

The communication link 230 may consist of one of the following: a serial link supporting the Modbus protocol for exchanging data between the master device 300 and the devices (e.g. 310, 320, 330 and 340) of the daisy chain communication configuration, a cabled Ethernet network supporting the IP protocol stack, a common electronic bus supporting a dedicated communication protocol (when all the devices are part of the same electronic chassis), a wireless communication infrastructure, etc.

The master device 300 may comprise a user interface (e.g. a keyboard, mouse, touchscreen not represented in FIG. 2) and a display (not represented in FIG. 2) for allowing a user to interact with the master device 300.

Instructions of a computer program may implement the steps of the method 100 performed by the master device 300. The instructions are comprised in a computer program product (e.g. memory 304) and provide for configuring devices in the daisy chain communication configuration, when executed by a processor of the processing unit 302. The instructions are deliverable to the computer program product via electronically-readable media, such as a storage media (e.g. a CD ROM or an USB key not represented in FIG. 2) or via communication links (e.g. via the communication link 230 through the communication interface 306).

The devices 310, 320, 330 and 340 are daisy-chained devices which receive an input signal, initially generated by the master device 300 (signal 200) and forwarded along the daisy chain communication configuration, according to the method 100. The daisy chain communication configuration comprises a plurality (at least two) of devices, including the first device 310 of the daisy chain. Devices 320, 330 and 340 represent three devices which follow one another and have the respective ranks I−1, I and I+1 in the daisy chain communication configuration. Internal components have been represented for the daisy-chained device 330 only (for simplification purposes), and the other daisy-chained devices (310, 320 and 340) have similar internal components. However, each of the daisy-chained devices (310, 320 and 340) could further have other components not shown herein for clarification purposes.

Each of the daisy-chained devices 310, 320, 330 and 340 comprises a processing functionality 331 and a signal transmission functionality 335. The processing functionality 331 may be implemented on a detachable electronic board, which can be easily removed and replaced without preventing the signal transmission functionality 335 to operate normally during the removal and replacement process.

The processing functionality 331 comprises a processing unit 332, having one or more processors (not represented in FIG. 3) capable of executing instructions of a computer program. Each processor may further have one or several cores. The processing functionality 331 also comprises memory 334 for storing instructions of the computer program, data generated by the execution of the computer program, etc. Only a single memory 334 is represented in FIG. 3, but the processing functionality 331 may comprise several types of memories, including volatile memory (such as a volatile Random Access Memory (RAM)), non-volatile memory (such as a hard drive), etc.

The processing functionality 331 further comprises a communication interface 333 for exchanging data with the master device 300 over the communication link 230.

Instructions of a computer program may implement the steps of the method 100 performed by the daisy-chained devices 310, 320,330 and 340. The instructions are comprised in a computer program product (e.g. memory 334) and provide for configuring the devices in the daisy chain communication configuration, when executed by each processor of the processing unit (for example 332). The instructions are deliverable to the computer program product via electronically-readable media, such as a storage media (e.g. a CD ROM or an USB key not represented in FIG. 3) or via communication links (e.g. via the communication link 230 through the communication interface 333).

The signal transmission functionality 335 comprises an input 336 for receiving an input signal 210, transmitted by the previous device 320 in the daisy chain communication configuration, and an output 338 for transmitting an output signal 212 to the following device 340 in a daisy chain communication configuration.

A signal 200 generated by the master device 300 is transmitted to the first device 310 in the daisy chain communication configuration, and propagated from device to device along the daisy chain communication configuration (via the respective inputs 336 and outputs 338 of each device), until the last device in the daisy chain communication configuration is reached. Furthermore, as will be detailed later in the description, the frequency of the propagated signal is modified by the signal transmission functionality 335 of each device in the daisy chain communication configuration.

The infrastructure for propagating the signals along the daisy chain communication configuration may consist of one of the following: a common electronic bus (when all the devices are part of the same electronic chassis), a point to point wired link between each consecutive devices, a point to point wireless link between each consecutive devices, etc.

The daisy-chained devices 310, 320, 330 and 340 may comprise a user interface (e.g. a keyboard, mouse, touchscreen not represented in FIG. 3) and a display (not represented in FIG. 3) for allowing a user to interact with the daisy-chained device.

Following is a description of the steps of the method 100.

The method 100 comprises the step of generating 110 at the master device 300 a signal 200 having a pre-determined base frequency $F_0$. The master device 300 comprises a clock source (not represented in FIG. 2) for generating the signal 200 at the base frequency $F_0$. The signal 200 may be very basic, since its sole purpose is to carry the base frequency $F_0$. For example, the signal 200 may consist of a square wave.

The method 100 comprises the step of outputting 120 the signal 200 generated by the master device 300 to a first device 310 in the daisy chain communication configuration.

The steps 110 and 120 are performed sequentially under the control of the processing unit 302. It will be detailed later in the description under which conditions the processing unit 302 triggers the steps 110 and 120.

The method 100 comprises the step of consecutively receiving 130 at each of the daisy-chained devices 310, 320, 330 and 340 in the daisy chain communication configuration an input signal. At the first daisy-chained device 310, the input signal is received from the master device 300, at the second daisy-chained device 320, the input signal is received from the first daisy-chained device 310, and so on. The input signal is thus received from the previous device in the daisy chain communication configuration.

The input signal received by each of the consecutive daisy-chained devices 310, 320, 330 and 340 has a different input frequency. The input signal is received via the input 336 of the first daisy-chained device 310, 320, 330 and 340.

The method 100 further comprises the step of consecutively generating 140 at each of the daisy-chained devices 310, 320, 330 and 340 an output signal having a frequency different that the input signal received. The signal transmission functionality 335 of each daisy-chained devices 310, 320, 330 and 340 comprises a frequency divider 337 for generating the output signal based on the input signal, but having an output frequency different than the input signal. For example, the output signal may be generated by performing a division of frequency by half of the input signal. Frequency dividers consist of electronic circuits well known in the art. For example, the frequency divider may be implemented by an analogic binary counter. The input signal received by a daisy-chained device of rank I in the daisy chain communication configuration generates an output signal of frequency $F_I = F_0/I$. The output signal outputted by the daisy-chained device of rank I in the daisy chain communication configuration has the frequency $F_I = F_0/(I+1)$. Thus, if the base frequency $F_0$ is 40 kHz, the input frequencies of the received signals received by the daisy-chained devices of rank 1, 2 and I in the daisy chain communication configuration are respectively 40 kHz, 20 kHz and 40/I kHz, while the output frequencies of the outputted signals by the daisy-chained devices of rank 1, 2 and I in the daisy-chained communication configuration are respectively 20 kHz, 10 kHz and 40/(I+1).

Alternatively, the output frequency $F_{I+1}$ of the output signal may be generated by incrementing or decrementing the input frequency $F_I$ of the input signal by a pre-determined value $\Delta$. The signal transmission functionality 335 comprises another specialized electronic circuit in place of the frequency divider 337, capable of generating the output signal 212 based on the input signal 210 by performing an increment or decrement of frequency by a pre-determined value. The input signal received by the daisy-chained device of rank I in the daisy chain communication configuration has the input frequency $F_I = F_0 + (I-1)*\Delta$ or $F_I = F_0 - (I-1)*\Delta$. The output signal outputted by the daisy-chained device of rank I in the daisy chain communication configuration has the output frequency $F_I = F_0 + I*\Delta$ or $F_I = F_0 - I*\Delta$. For example, if the base frequency $F_0$ is 40 kHz and the pre-determined increment value $\Delta$ is 20 kHz, the input frequencies of the signals received by the devices of rank 1, 2 and I in the daisy chain communication configuration are respectively 40 kHz, 60 kHz and 40+20*(I-1) kHz. A person skilled in the art may design other algorithms (implementable via a specialized electronic circuit in the signal transmission functionality 335) for generating an output signal having an output frequency $F_I$ based on the pre-determined base frequency $F_0$ and a position I of the device in the daisy chain communication configuration.

In both previous examples (frequency divider or predetermined increment/decrement), the output frequency of the signal generated by the current device 330 is based on the pre-determined base frequency $F_0$ of the master device 300, and the position I of the device in the daisy chain communication configuration.

The method 100 also comprises the step of outputting 150 the output signal to the following device in the daisy chain communication configuration. The output signal is outputted via the output 338 of the daisy-chained device.

The method 100 comprises the step of determining an address of the current device 330 based on the frequency $F_I$ of the received signal 210.

An electronic circuit (not represented in FIG. 3) of the signal transmission functionality 335 may extract the input frequency $F_I$ of the input signal 210 received, and transmit the input frequency $F_I$ to the processing unit 332. Alternatively, the input signal may be transmitted by the input 336 to an electronic circuit (not represented in FIG. 3) of the processing functionality 331, which extracts the input frequency $F_I$ of the signal 210 and transmits the input frequency $F_I$ to the processing unit 332.

In a particular aspect, an address lookup table 220 is stored in the memory 334. The address lookup table 220 comprises a plurality of addresses and corresponding frequencies. The address lookup table 220 shall be interpreted in a broad sense, as any data structure capable of storing a plurality of addresses and corresponding frequencies. The address of each daisy-chained devices 310, 320, 330 and 340 is determined by its processing unit 332 via the address lookup table 220, by identifying the address corresponding to the input frequency $F_I$ of the signal 210 in the address lookup table 220.

The address lookup table 220 may be transferred by an operator in the memory 334 from an Universal Serial Bus (USB) key or portable hard drive (if the current device 330 comprises an USB interface), from a computing device such as a tablet or a laptop via an Bluetooth or Near Field Communication (NFC) interface (if the current device 330 comprises an Bluetooth or NFC interface), etc. Alternatively, the address lookup table 220 is initially transferred in the memory 304 of the master device 300 by an operator via one of USB, Bluetooth, NFC, etc. means. The address lookup table 220 can then be transmitted via the communication interface 306 on the communication link 230 in a broadcast message. The broadcast message is received by all the daisy-chained devices (e.g. 310, 320, 330 and 340) of the daisy chain communication configuration via their communication interface 333. The address lookup table 220 is extracted from the broadcast message by the processing unit 332 and stored in the memory 334. The communication interface 333 does not need to have an address configured to be capable of receiving a broadcast message.

In another particular aspect, the address of each of the daisy-chained devices 310, 320, 330 and 340 may be generated by its processing unit 332 based on the input frequency $F_I$ of the input signal. For instance, if the address is an IP address, the input frequency $F_I$ can be used for generating the part of the address that is not a prefix (the interface ID). This is particularly true in the case of IPv6, where a large number of bits is allocated to the interface ID part of the address, allowing for directly using the value of the input frequency $F_I$ in the interface ID part of the address.

The address determined by the processing unit 332 is the address of the communication interface 333 used for exchanging data with the master device 300. Once the address is determined, the processing unit 332 configures the communication interface 333 with the determined address. The configuration of a communication interface with an address is out of the scope of the present disclosure, since it is well known in the art. It is dependent on the type of communication link 230 (e.g. serial bus, cabled Ethernet network, etc.) and the type of communication protocols used for exchanging data over the communication link 230 (e.g. Modbus, IP protocol stack, etc.).

Once the communication interface 333 of each daisy-chained devices in the daisy chain communication configuration is configured with the determined address, one of the daisy-chained devices (for example 330) and the master device 300 can exchange data over the communication link 230. The master device 300 can send data to the daisy-chained device 330, by using its configured address as the destination address. The master device 300 can receive data from the daisy-chained device 330 and identify the daisy-chained device 330 as being the sender, by identifying its configured address as being the source address.

The memory 304 of the master device 300 stores for each daisy-chained device of the daisy chain communication configuration the address of the daisy-chained device and characteristics. For example, as illustrated in FIG. 2, the memory 304 stores a daisy-chained device table 305, comprising for each entry in the table the address and characteristics of one of the daisy-chained devices. The daisy-chained device table 305 shall be interpreted in a broad sense, as any data structure capable of storing a plurality of addresses and corresponding device characteristics.

The data generated by the processing unit 302 for transmission to a particular one of the daisy-chained devices (for example 330) of the daisy chain communication (via the communication interface 306) depends on the particular characteristics of the particular daisy-chained device stored in the memory 304 (e.g. in the daisy-chained device table 305). Similarly, the processing applied by the processing unit 302 to data received (via the communication interface 306) from a particular device (e.g. 330) of the daisy chain communication depend on the particular characteristics of the particular device stored in the memory 304 (e.g. in the daisy-chained device table 305).

The characteristics comprise a type of the particular device. For example, the type of the particular device may be an environment controller, a sensor or a controlled device. The characteristics may also comprise a sub-type of the device. In the case of a sensor, the sub-type can be a temperature measurement sensor, a humidity measurement sensor, an air pressure measurement sensor, a voltage measurement sensor, etc. In the case of a controlled appliance, the sub-type can be a temperature thermostat, a ventilation system, an apparatus on/off switch. For example, the processing applied by the processing unit 302 to environmental characteristic values received from a temperature measurement sensor is different from the processing applied to environmental characteristic values received from a voltage measurement sensor. Similarly, a command generated by the processing unit 302 for transmission to a temperature thermostat is different from a command generated for transmission to a ventilation system. In the case where the particular device is an environment controller, the characteristics may also comprise a list of devices (e.g. sensors and/or controlled appliances) under its control, along with characteristics of each device under its control. The characteristics may further comprise configuration parameters of the devices (e.g. a range of temperatures for a temperature thermostat, a range of speeds for a ventilation system, etc.)

The characteristics may also include a logical name of the device. The logical name of a device can for example combine a function of the device and a location of the device. In the context of an environment control system where the daisy-chained devices are environment controllers, examples of logical names are: controller_room_1, controller_room_2, etc. When the daisy-chained devices are controlled appliances, examples of logical names are: thermostat_room_1, thermostat_room_2, camera_main_door, etc. The advantage of using logical names (over for example a MAC address or a serial number of the device) is that they remain constant over time, even if the device needs to be replaced by a new device with the same function.

The daisy-chained device table 305 may be transferred by an operator in the memory 304 from an Universal Serial Bus (USB) key or portable hard drive (if the master device 300 comprises an USB interface), from a computing device such as a tablet or a laptop via an Bluetooth or Near Field Communication (NFC) interface (if the master device 300 comprises an Bluetooth or NFC interface), etc.

Alternatively, the characteristics of one or several of the daisy-chained devices (e.g. 330) of the daisy chain communication configuration may be directly transmitted by the device (via its communication interface 333) over the communication link 230 to the master device 300. The characteristics are received by the master device 300 via its communication interface 306, processed by its processing unit 302 (match the received characteristics to the corresponding address of the device), and stored in its memory 304 (e.g. in the daisy-chained device table 305). In this case, if a device is added in the daisy chain communication configuration, or replaced by another device, no operator intervention is required for updating the master device 300, since the new device automatically transmits its characteristics to the master device 300.

In a particular aspect, the master device 300 regularly sends a presence request over the communication link 230 to all the daisy-chained devices of the daisy chain communication configuration, addressing each daisy-chained device with its address stored in the memory 304 (e.g. in the daisy-chained device table 305). Upon reception of the presence request, each daisy-chained device is configured to send a presence response over the communication link 230 to the master device 300. If a presence response is not received for a particular daisy-chained device within a pre-defined time interval, the processing unit 302 of the master device 300 determines that it is no longer capable of exchanging data with this particular daisy-chained device using the address of the particular daisy-chained device stored in its memory 304. Consequently, the processing unit 302 triggers a transmission by the output 308 of the signal 200 having the pre-determined frequency to the first daisy-chained device 310 in the daisy chain communication configuration, to initiate steps 110 to 160 of the method 100. If the address determined at step 160 is different from the address currently configured on the communication interface 333 of the daisy-chained device, or if no address is currently configured on the communication interface 333 of the daisy-chained device, the communication interface 333 is (re)configured with the determined address. Otherwise, the communication interface 333 retains its currently configured address.

This situation may occur when a daisy-chained device of the daisy chain communication configuration is replaced by another device (alternatively, only the processing functionality 331 of the device is replaced and the signal transmission functionality 335 is not replaced). In this case, the master device 300 is capable of automatically detecting the replacement with the presence request/presence response mechanism, and initiating steps 110 to 160 of the method 100. Only the replaced daisy-chained device needs to have the address of its communication interface 333 reconfigured.

In the case where a device is added to/removed from the daisy chain communication configuration, the master device 300 may be capable of automatically detecting the addition/removal with the presence request/presence response mechanisms, and initiating steps 110 to 160 of the method 100. Alternatively, if the master device 300 is not capable of automatically detecting the addition/removal, steps 110 to 160 of the method 100 may be initiated by an operator via a user interface of the master device 300.

In a particular aspect, each of the daisy-chained devices exchanges environmental data (through their communication interface 333) with the master device 300 (through the communication interface 306) over the communication link 230, and are hence also alternately referred as daisy-chained environment controllers.

Figure 4:
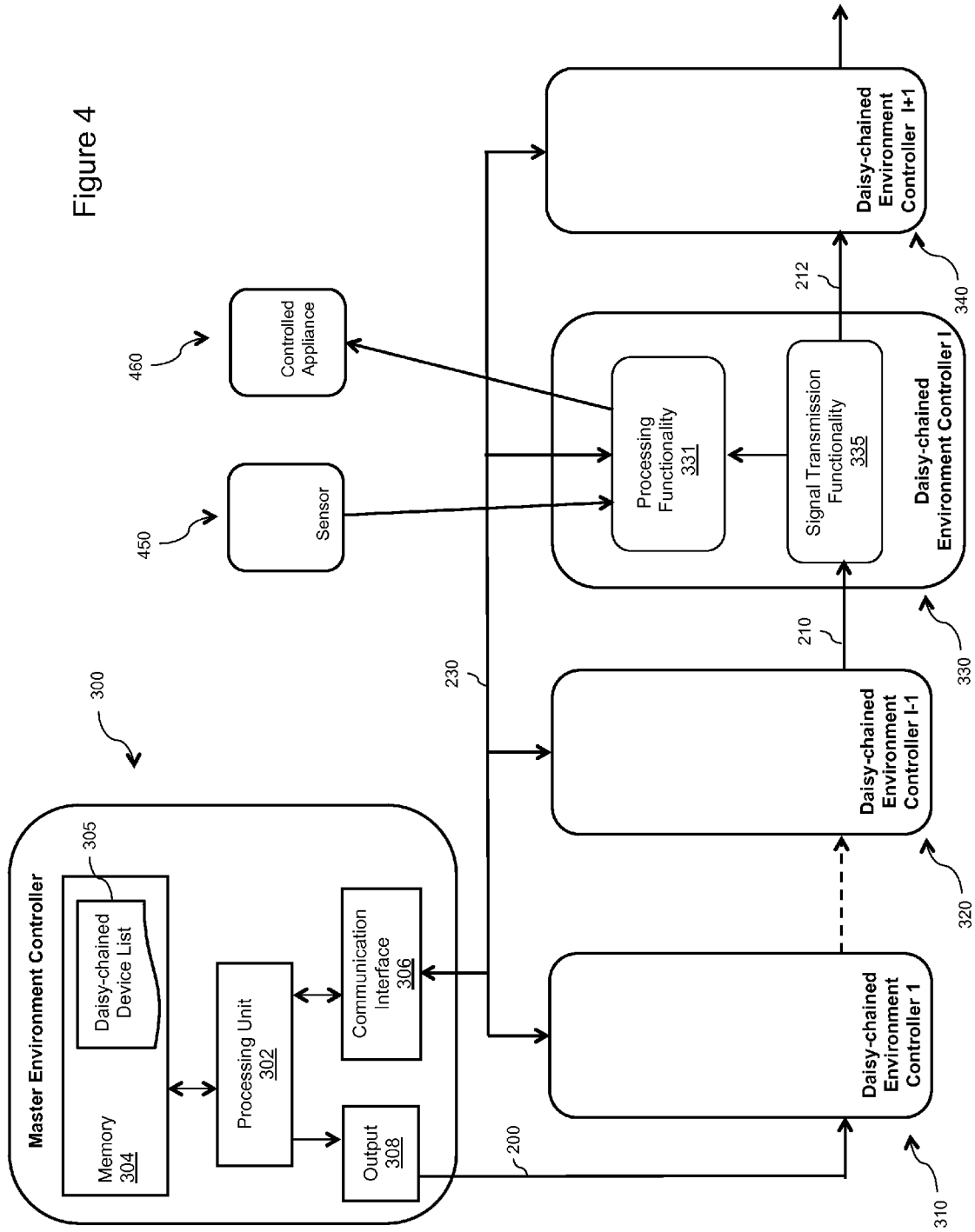
FIG. 4 illustrates the devices of FIG. 2 where the daisy-chained devices are environment controllers.

Referring now concurrently to FIGS. 2, 3 and 4, the daisy-chained devices (e.g. 310, 320, 330 and 340) consist of environment controllers capable of receiving environmental characteristic values from sensors and/or transmitting commands to controlled appliances. For example, the daisy-chained environment controller 330 receives environmental characteristic values from a sensor 450 and transmits commands to a controlled appliance 460. The environmental characteristics values are received from the sensor 450 via an environment control interface of the processing functionality 331 of the daisy-chained environment controller 330. Similarly, the commands are transmitted to the controlled appliance 460 via the environment control interface. In a particular embodiment, the environment control interface may comprise electrical wires connected to the sensor 450 and controlled appliance 460, the environmental characteristics values and commands being represented by a current voltage. Although a single sensor 450 and a single controlled appliance 460 are represented in FIGS. 3 and 4 (for simplification purposes), the daisy-chained environment controller 330 may have several sensors 450 and/or several controlled appliances 460 under its control.

The master device 300 consists of a master environment controller, in charge of controlling the plurality of daisy-chained environment controllers (e.g. 310, 320, 330 and 340).

The processing unit 302 of the master environment controller 300 generates a command and transmits the generated command (via its communication interface 306) over the communication link 230 to a target daisy-chained environment controller 330 identified by its configured address. The target daisy-chained environment controller 330 receives the command via its communication interface 333 and processes the received command with its processing unit 332 (e.g. adapting the received command to local conditions known only by the target daisy-chained environment controller 330). The command is further transmitted to the controlled appliance 460 via the environment control interface. The daisy-chained environment controller 330 has a function of relay between the master environment controller 300 and the controlled appliance 460.

The daisy-chained environment controller 330 receives an environmental characteristic value from the sensor 450 via its environment control interface. The environmental characteristic value is transmitted to the master environment controller 300 over the communication link 230 via the communication interface 333. The environmental characteristic value is received by the master environment controller 300 via its communication interface 306 and processed by its processing unit 302. The daisy-chained environment controller 330 is identified by the master environment controller 300 as being the source of the transmitted environmental data, by determining that the source address of the transmitted environmental data is the configured address of the daisy-chained environment controller 330. The daisy-chained environment controller 330 has a function of relay between the master environment controller 300 and the sensor 450.

The environmental data transmitted by the master environment controller 300 to the target daisy-chained environment controller 330 may also comprise environmental configuration data. The processing unit 332 of the target daisy-chained environment controller 330 processes the received environmental configuration to configure the target daisy-chained environment controller 330 accordingly. For instance, the configuration consists in determining how the environmental characteristic values received from sensor(s) 450 are processed and how the commands transmitted to controlled appliance(s) 460 are generated. Examples of configurations include: ignoring values received from a particular sensor 450 or not transmitting commands to a particular controlled appliance 460 (e.g. because they are presently not operating properly), configuring the daisy-chained environment controller 330 to directly process values received from a particular sensor 450 to generate commands for a particular controlled appliance 460 without involving the master environment controller 300, defining new threshold values of an algorithm implemented by software instructions executed by the processing unit 332 for processing values received from a sensor 450 or commands received from the master environment controller 300 (for transmission to a controlled appliances 460), using a new software program (transmitted by the master environment controller 300) for processing values received from a sensor 450 or commands received from the master environment controller 300 (for transmission to a controlled appliances 460), etc.

Figure 5:
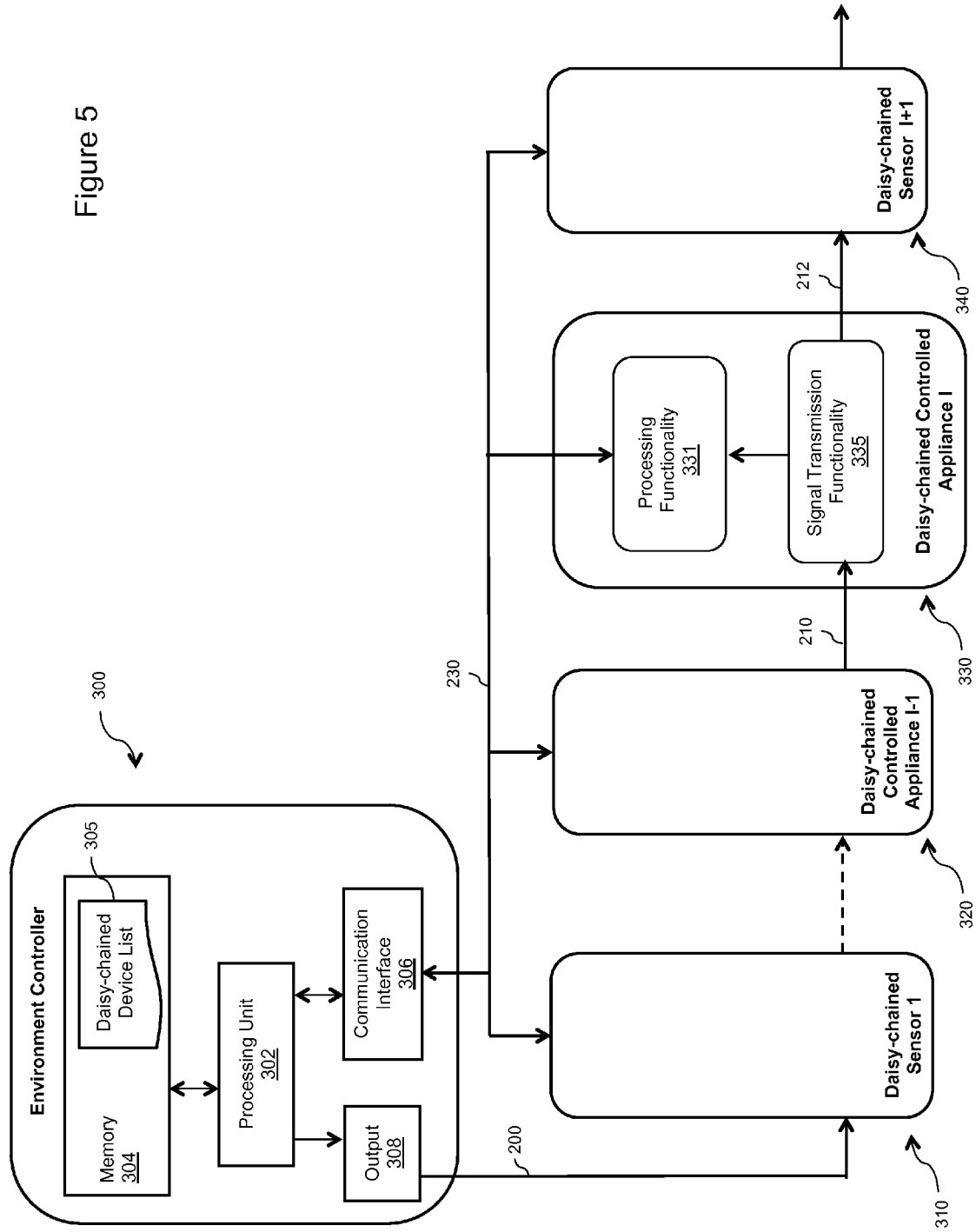
FIG. 5 illustrates the devices of FIG. 2 where the daisy-chained devices are controlled appliances or sensors.

In another aspect, referring now concurrently to FIGS. 2, 3 and 5, the daisy-chained devices (e.g. 310, 320, 330 and 340) may consist in controlled appliances (e.g. 320 and 330) capable of receiving commands from an environment controller and executing the commands, and/or sensors (e.g. 310 and 340) capable of transmitting environmental characteristic values to the environment controller.

The master device 300 consists of the environment controller, in charge of transmitting commands to the plurality of controlled appliances (e.g. 320 and 330) of the daisy chain communication configuration, and receiving the environmental characteristic values from the sensors (e.g. 310 and 340).

In contrast with the sensors 450 and controlled appliances 460 represented in FIG. 4, the sensors (310 and 340) and controlled appliances (320 and 330) represented in FIG. 5 have the capability to exchange environmental data with the environment controller 300 over a shared communication link 230, via a communication interface 333 adapted to interface with the communication link 230. The processing functionality 331 of a daisy-chained device (e.g. 310 or 330) includes additional components not represented in FIG. 3 for implementing the particular functionalities of a controlled appliance or sensor.

The processing unit 302 of the environment controller 300 generates a command and transmits the generated command (via its communication interface 306) over the communication link 230 to a target controlled appliance (e.g. 320 or 330) identified by its configured address. The target controlled appliance (e.g. 320 or 330) receives the command via its communication interface 333 and processes the received command with its processing unit 332. Processing the command comprises executing the command to perform a particular environment control functionality supported by the controlled appliance (e.g. 320 or 330).

A sensor (e.g. 310 or 340) transmits an environmental characteristic value to the environment controller 300 over the communication link 230 via its communication interface 333. The environmental characteristic value is received by the environment controller 300 via its communication interface 306 and processed by its processing unit 302.

Alternative configurations of master devices and daisy-chained devices may be deployed in the context of an environment control system. For example, the configurations represented in FIG. 4 and FIG. 5 may be combined, with one or several of the daisy-chained environment controllers (e.g. 330) of FIG. 4 playing the role of the environment controller 300 of FIG. 5 with respect to daisy-chained controlled appliances (e.g. 320) or sensors (e.g. 310) represented in FIG. 5.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A daisy-chained device for use in a daisy chain communication configuration, the daisy-chained device comprising:
    an input for receiving an input signal having an input frequency from a preceding device in the daisy chain communication configuration;
    a frequency divider for generating an output signal having an output frequency different and based on the input frequency;
    an output for outputting the output signal to a following device in the daisy chain communication configuration; and
    a processing unit comprising at least one processor for determining an address of the daisy-chained device based on the input frequency of the input signal.

2. The daisy-chained device of claim 1, further comprising memory for storing an address lookup table comprising a plurality of addresses and corresponding frequencies, the address of the daisy-chained device being determined by the processing unit via the address lookup table.

3. The daisy-chained device of claim 1, further comprising a communication interface for exchanging data with a master device, the communication interface being configured with the address determined by the processing unit.

4. The daisy-chained device of claim 3, wherein the daisy-chained device transmits characteristics of the daisy-chained device to the master device via the communication interface.

5. The daisy-chained device of claim 3, wherein the daisy-chained device exchanges environmental data with the master device via the communication interface.

6. The daisy-chained device of claim 5, consisting of an environment controller capable of receiving environmental characteristic values from sensors or transmitting commands to controlled appliances.

7. The daisy-chained device of claim 6, wherein the environment controller receives a command from the master device via the communication interface and transmits the command to a controlled appliance.

8. The daisy-chained device of claim 6, wherein the environment controller receives an environmental characteristic value from a sensor and transmits the environmental characteristic value to the master device via the communication interface.

9. The daisy-chained device of claim 5, consisting of a controlled appliance receiving commands from the master device via the communication interface, and executing the commands.

10. The daisy-chained device of claim 5, consisting of a sensor transmitting environmental characteristic values to the master device via the communication interface.

11. A master device for use in a daisy chain communication configuration, the daisy chain communication configuration comprising daisy-chained devices, the master device comprising:
    memory for storing addresses of the daisy-chained devices and characteristics of the daisy-chained devices;
    an output for transmitting a signal having a pre-determined frequency to a first daisy-chained device in the daisy chain communication configuration;
    a communication interface for exchanging data with the daisy-chained devices of the daisy chain communication configuration using the addresses of the daisy-chained devices stored in the memory, each exchange of data occurring directly between the master device and one of the daisy-chained devices of the daisy chain communication configuration without transiting through other daisy-chained devices of the daisy chain communication configuration; and a processing unit for:
generating the data transmitted to the daisy-chained devices of the daisy chain communication configuration via the communication interface, the generated data depending on the characteristics of the daisy-chained devices stored in the memory, and
processing the data received from the daisy-chained devices of the daisy chain communication configuration via the configuration interface, the processing depending on the characteristics of the daisy-chained devices stored in the memory.

12. The master device of claim 11, wherein the characteristics of the daisy-chained devices of the daisy chain communication configuration are received via the communication interface, the characteristics of the daisy-chained devices comprising a type of the daisy-chained devices.

13. The master device of claim 11, wherein the processing unit determines that it is no longer capable of exchanging data with one of the daisy-chained devices of the daisy chain communication configuration using the address of the one of daisy-chained devices stored in the memory, and the processing unit triggers the transmission by the output of the signal having the pre-determined frequency to the first daisy-chained device in the daisy chain communication configuration.

14. The master device of claim 11, wherein the data exchanged are environmental data.

15. A method for configuring daisy-chained devices in a daisy chain communication configuration, comprising:
generating at a master device a signal having a pre-determined base frequency;
outputting the signal at the pre-determined based frequency to a first daisy-chained device in the daisy chain communication configuration;
receiving an input signal at one of the daisy-chained devices in the daisy chain communication configuration from a previous daisy-chained device in the daisy chain communication configuration, the input signal having an input frequency;
generating at the one of the daisy-chained devices an output signal having a frequency different to and based on the input frequency;
outputting the output signal to a following daisy-chained device in the daisy chain communication configuration; and
determining an address of the one of the daisy-chained devices based on the input frequency of the input signal.

16. The method of claim 15, wherein the output frequency is half the input frequency.

17. The method of claim 15, further comprising storing an address lookup table comprising a plurality of addresses and corresponding frequencies at each of the daisy-chained devices, the address of each of the daisy-chained devices being determined via the address lookup table.

18. The method of claim 15, wherein each of the daisy-chained devices comprise a communication interface for exchanging data with the master device, the communication interface being configured with the determined address.

19. The method of claim 18, wherein each of the daisy-chained devices transmit characteristics of the current daisy-chained device to the master device via the communication interface.

20. The method of claim 18, wherein at least one of the daisy-chained devices exchanges environmental data with the master device via the communication interface, and the at least one of the daisy-chained devices is one of the following: an environment controller, a controlled appliance or a sensor.

* * * * *